(12) United States Patent
Berenzweig

(10) Patent No.: US 6,584,310 B1
(45) Date of Patent: Jun. 24, 2003

(54) METHOD AND APPARATUS FOR PERFORMING AUTHENTICATION IN COMMUNICATION SYSTEMS

(75) Inventor: Adam L. Berenzweig, New York, NY (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/073,870

(22) Filed: May 7, 1998

(51) Int. Cl.$^7$ .............................. H04Q 7/20; H04K 1/00; H04L 9/00; H04N 7/167
(52) U.S. Cl. ........................... 455/432; 380/25; 380/30; 380/218
(58) Field of Search .................... 455/411, 432, 455/461, 422, 433; 380/25, 30, 248, 281

(56) References Cited

U.S. PATENT DOCUMENTS

| | | | |
|---|---|---|---|
| 5,537,474 A | * 7/1996 | Brown et al. | 380/248 |
| 5,557,765 A | * 9/1996 | Lipner et al. | 380/218 |
| 5,761,309 A | * 6/1998 | Ohashi et al. | 380/25 |
| 5,778,072 A | * 7/1998 | Samar | 380/30 |
| 5,862,481 A | * 1/1999 | Kulkarni et al. | 455/432 |
| 6,052,468 A | * 4/2000 | Hillhouse | 380/281 |
| 6,073,017 A | * 6/2000 | Xu et al. | 455/422 |
| H1895 H | * 10/2000 | Hoffpauir et al. | 455/433 |
| 6,256,514 B1 | * 7/2001 | Dent et al. | 455/561 |

FOREIGN PATENT DOCUMENTS

| | | |
|---|---|---|
| EP | 955783 A2 * | 11/1999 |
| JP | 6-69882 | 3/1994 |
| WO | WO 9715161 | 4/1997 |
| WO | WO 9736447 | 10/1997 |
| WO | WO 97/38544 | 10/1997 |
| WO | WO 9800986 | 1/1998 |

OTHER PUBLICATIONS

Mohan, "Network Impacts of Privacy and Authentication Protocols for PCS", IEEE, Jun. 18, 1995.*
Bellcore, ISDN–Based C Interface Access for GSM (DCS 1900), SR–3546, Aug. 1995.*

* cited by examiner

Primary Examiner—William Cumming

(57) ABSTRACT

A method and apparatus for permitting global roaming between two communication networks which utilize different authentication schemes. The authentication interoperability function (AIF) and method translate between the authentication schemes of each network, for example, a triplet-based network and a shared secret data (SSD) network. When a user from a network that natively uses SSD authentication roams into a triplet-based network, the authentication interoperability function produces triplets from the current SSD. When a triplet user roams into an SSD network, the AIF produces SSD from the triplet.

2 Claims, 10 Drawing Sheets

METHOD AND APPARATUS FOR PERFORMING AUTHENTICATION IN COMMUNICATION SYSTEMS

BACKGROUND OF THE INVENTION

1. Field of the Invention

The present invention relates to authentication of users in a communication system, and more particularly to the authentication of users in a wireless network as the user roams between two communication systems with differing authentication schemes.

2. Description of the Related Art

There are currently different communication standards utilized in the U.S., Europe, and Japan. The U.S. currently utilizes three major systems, with differing standards. The first system is a time division multiple access system (TDMA) and is governed by IS-136, the second system is a code division multiple access (CDMA) system governed by IS-95, and the third is the Advanced Mobile Phone System (AMPS). All three communication systems use the IS-41 standard for intersystem messaging, which defines the authentication procedure.

In TDMA, users share a frequency band, each user's speech is stored, compressed and transmitted as a quick packet, using controlled time slots to distinguish them, hence the phrase "time division". At the receiver, the packet is decompressed. In the IS-136 protocol, three users share a given channel.

Traditional systems transmit a single strong signal, perhaps intermittently, on a narrow band. In contrast, CDMA works in reverse, sending a weak but very broad band signal. A unique code "spreads" the signal across the wide area of the spectrum (hence the alternative name—spread spectrum), and the receiver uses the same code to recover the signal from the noise. A very robust and secure channel can be established, even for an extremely low-power signal—theoretically, the signal can be weaker than the noise floor. Further, by using different codes, a number of different channels can simultaneously share the same spectrum, without interfering with each other.

The AMPS system is an analog system.

Europe utilizes the Global System for Mobiles (GSM) network as defined by the European Telecommunications Standard Institute (ETSI). GSM now has the support of 80 operators in over 40 countries including countries outside of Europe. GSM is a TDMA standard, with 8 users per channel. The speech is taken in 20 msec windows, which are sampled, processed, and compressed.

GSM is transmitted on a 900 MHz carrier. There is an alternative system operating at 1.8 GHz (DCS 1800), providing additional capacity, and is often viewed as more of a personal communication system (PCS) than a cellular system. In a similar way, the U.S. has also implemented DCS-1900, another GSM system operating on the different carrier of 1.9 GHz.

Personal Digital Cellular (PDC) is the Japanese standard, previously known as JDC (Japanese Digital Cellular). A TDMA standard similar to the U.S. IS-54 protocol, PDC is not in use anywhere else in the world.

The GSM network utilizes a user identification module (UIM) which is a credit card size card which is owned by a subscriber, who slides the UIM into any GSM handset to transform it into "their" phone. It will ring when their unique phone number is dialed, calls made will be billed to their account; all options and services connect; voice mail can be connected and so on. People with different UIMs can share one "physical" handset, turning it into several "virtual" handsets, one per UIM.

Similar to the U.S. systems, the GSM network also permits "roaming", by which different network operators agree to recognize (and accept) subscribers from other networks, as phones (or UIMs) move. So, British subscribers can drive through France or Germany, and use their GSM phone to make and receive calls (on their same UK number), with as much ease as an American businessman can use a phone in Boston, Miami, or Seattle, within any one of the U.S. systems.

Regardless of the telephone communication system, when a subscriber places a call, his or her telephone indicates to the service provider the identity of the caller for billing purposes. The service provider must then "authenticate" the identity of the caller in order to ensure that he or she is an authorized user.

The GSM authentication scheme is illustrated in prior art FIGS. 1 and 2. This authentication scheme includes a home location register (HLR) 10, a visiting location register (VLR) 20, and a mobile terminal (MT) 30, which includes a UIM 32. When the mobile terminal 30 places a call, a request is sent to the home location register 10, which generates an authentication triplet (RAND, SRES, $K_c$) from a root key $K_i$. The triplet includes a random number RAND, a signed response SRES, and a session key $K_c$. The triplet is provided to the visiting location register 20, which passes the random number RAND to the mobile terminal 30. The UIM 32 receives the random number RAND, and utilizing the root key $K_i$, the random number RAND, and an algorithm A3, calculates a signed response SRES. The UIM 32 also utilizes the root key $K_i$ and the random number RAND, and an algorithm A8 to calculate the session key $K_c$.

The SRES, calculated by the UIM 32, is returned to the visiting location register 20, which compares this value from the SRES received from the home location register 10, in order to authenticate the subscriber using the mobile terminal 30.

In the GSM "challenge/response" authentication system, the visiting location register 20 never receives the root key $K_i$ being held by the UIM 32 and the home location register 10. The VLR 20 also does not need to know the authentication algorithms used by the HLR 10 and UIM 32. Also, in the GSM authentication scheme, the triplet must be sent for every phone call by the home location register 10. RAND is 128 bits, SRES is 32 bits, and $K_c$ is 64 bits, which is 224 bits of data for each request, which is a significant data load.

The IS-41 authentication scheme, used in U.S. TDMA, CDMA and AMPS systems, is illustrated in prior art FIGS. 3(a), 3(b) and 4. This authentication scheme involves a home location register (HLR) 40, a visiting location register (VLR) 50, and a mobile terminal (MT) 60, which includes a UIM 62. The root key, known as the A_key, is stored only in the HLR 40 and the UIM 62. There is a secondary key, known as Shared Secret Data SSD, which is sent to the VLR 50 during roaming. SSD is generated from the A_key and a random seed RANDSSD using a cryptographic algorithm, as illustrated in FIG. 3(a). In the IS-41 network, this algorithm is CAVE (Cellular Authentication and Voice Encryption). When the MT 60 roams to a visiting network, the VLR 50 sends an authentication request to the HLR 40, which responds by sending that subscriber's SSD.

Once the VLR 50 has the SSD, it can authenticate the MT 30 independently of the HLR 40, as illustrated in FIG. 3(b).

The VLR 50 sends a random number RAND to the UIM 62 via the MT 60, and the UIM 62 calculates the authentication response (AUTHR) using RAND and the stored value of SSD in UIM 62. AUTHR is returned to the VLR 50, which checks it against the value of AUTHR that it has independently calculated in the same manner. If the two AUTHR values match, the MT 60 is declared valid.

This scheme is efficient in two ways. One, the amount of data passed over the long-distance signaling link between the HLR 40 and the VLR 50 is very small (the 128-bit SSD), and one such transfer is sufficient for the entire registration period. Two, the VLR 50 may authenticate the user before assigning a traffic channel which is possible because RAND can be generated locally and need not be generated by the HLR 40.

To generate encryption session keys, the internal state of the CAVE algorithm is preserved after the authentication calculation. Several levels of encryption keys are then calculated using the post-authentication state of CAVE and the current value of SSD, as illustrated in FIG. 4.

The goal of the International Mobile Telecommunications—2000 (IMT-2000) standards development effort is to provide a global telecommunications system which will support a phone subscription anywhere in the world and will also permit a subscriber to "roam globally". In order to realize this system, interfaces must be provided between the various systems (GSM, IS-41, PDC, etc.) which permit subscribers from different systems to "roam" into other systems. Currently such "global" roaming is unavailable. The International Telecommunication Union (ITU) is working to develop standards which allow global roaming which will be accomplished with a standardized network-to-network interface (NNI) and UIM-MT interface, which must be capable of passing messages which permit proper authentication of the identity of each caller.

Several types of global roaming are permitted including: removable UIMs, multi-mode terminals (terminals that can communicate with more than one air interface standard), and downloadable UIMs (terminals which receive service profile information over the air). All three roaming scenarios are equivalent for the purposes of the present invention. What matters is that a UIM from one network is visiting a network with a different authentication scheme, and the UIM must be authenticated using the security architecture of the local network.

SUMMARY OF THE INVENTION

The present invention addresses the authentication problem by providing an authentication interoperability function (AIF) that permits the authentication of users as they roam between networks that use different authentication schemes. More specifically, interoperability is possible if one network uses stored authentication triplets and a second network uses shared secondary keys, also known as shared secret data (SSD).

An authentication interoperability function (AIF) translates between the authentication schemes of each family of communication networks (IS-41, GSM, PDC) The AIF may be located at the HLR (Home Location Register) or AC (Authentication Center) of the home network, the VLR (Visited Location Register) of the visited network, or as a stand-alone interworking function (IWF) located elsewhere in the network.

When a user from a network that natively uses SSD authentication roams into a triplet-based network, the AIF will produce triplets from the current SSD. When a triplet user roams into an SSD network, the AIF will produce SSD from triplet(s).

The AIF of the present application preserves the current authentication architecture in each communication network family (GSM, IS-41, PDC), concentrates the changes which make the two communication networks compatible to the AIF, the Network-to-Network Interface (NNI), and the User Identity Module (UIM), and preserves the current level of security in each system.

DETAILED DESCRIPTION OF THE INVENTION

The present invention discloses how to authenticate a global roamer in IMT-2000. An authentication interoperability function is provided that integrates the authentication architectures of GSM MAP and IS-41 MAP. In particular, an authentication interoperability function (AIF) translates between the authentication schemes of the two families (for example, IS-41 and GSM). When an IS-41 user roams into a GSM network, the AIF produces triplets from the current SSD. When a GSM user roams into an IS-41 network, the AIF produces SSD from a single triplet.

Figure 1:
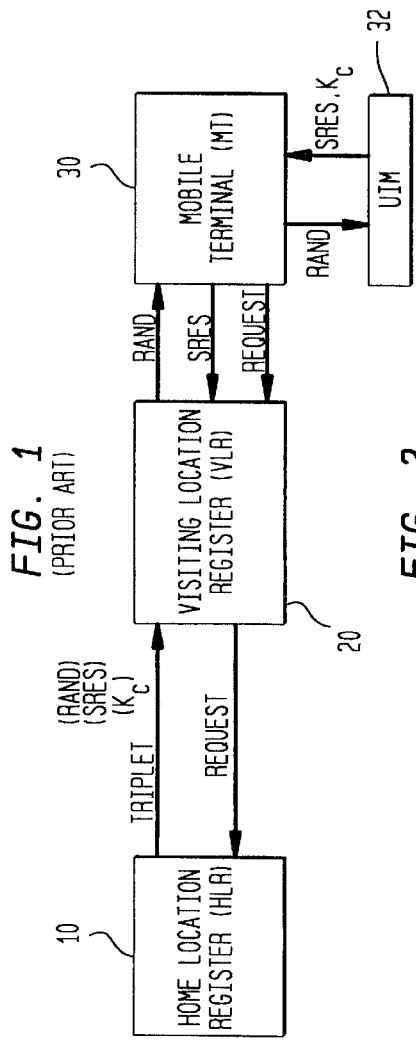
FIG. 1 is a block diagram illustrating the basic components of the prior art global system for mobiles (GSM) network.
Figure 2:
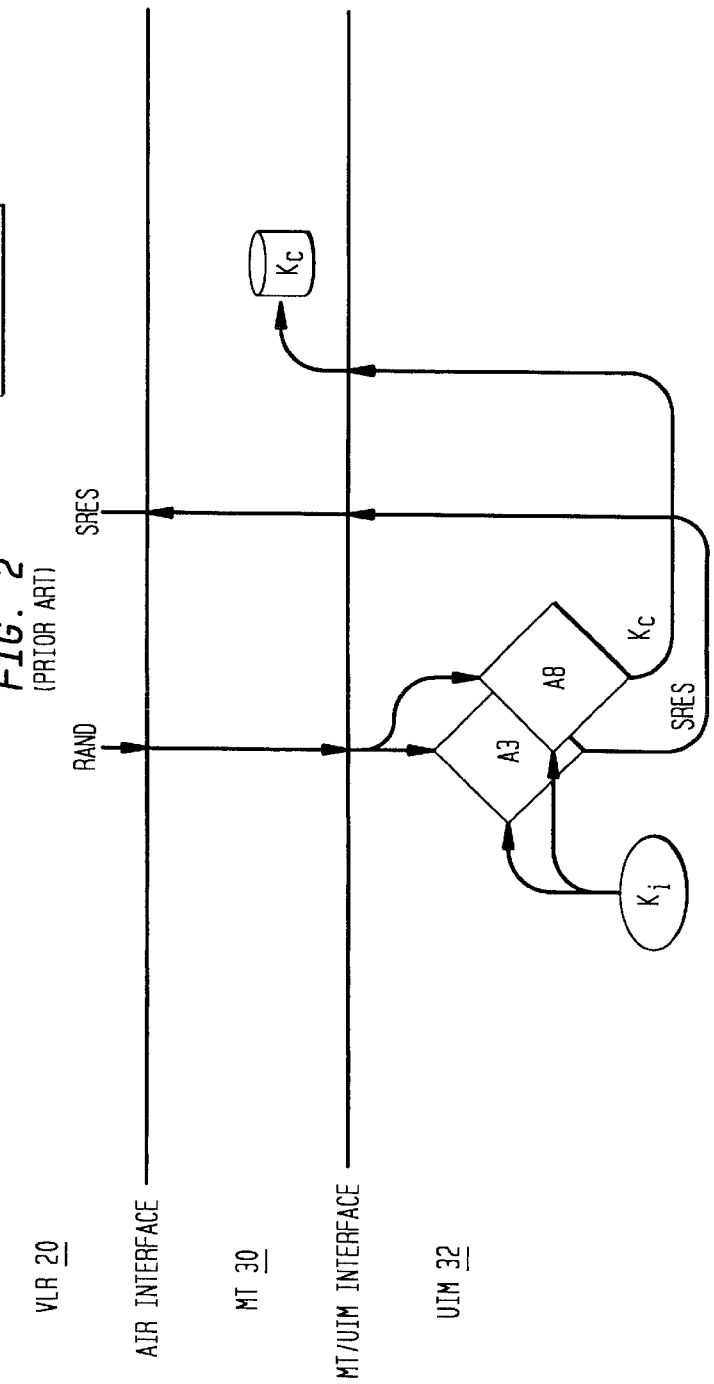
FIG. 2 is a prior art diagram of messages transmitted in the GSM network.
Figure 3A:
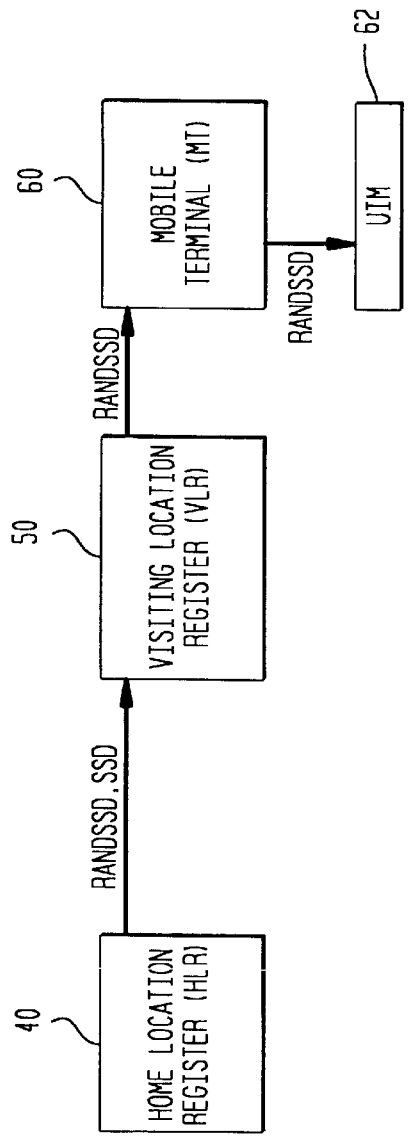
FIGS. 3(*a*) and 3(*b*) are block diagrams illustrating the basic components of the prior art IS-41 network.
Figure 3B:
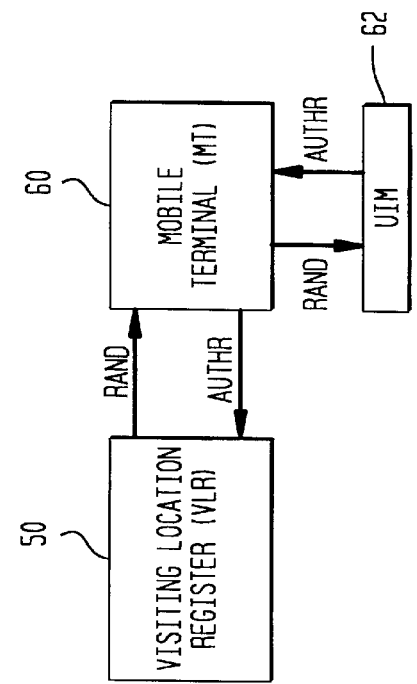
Figure 4:
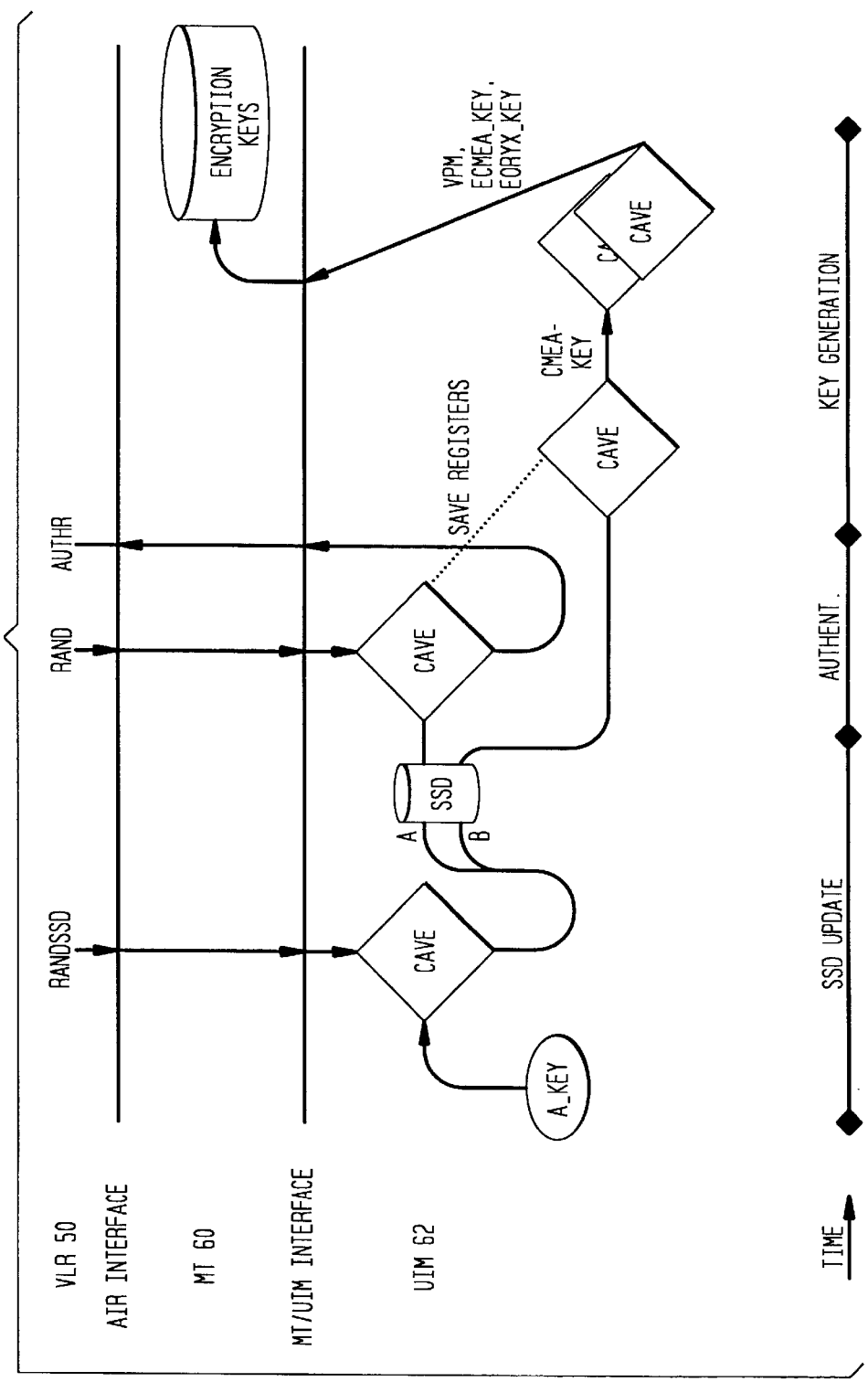
FIG. 4 illustrates the messages transmitted in the prior art IS-41 network illustrated in FIG. 3.
Figure 5:
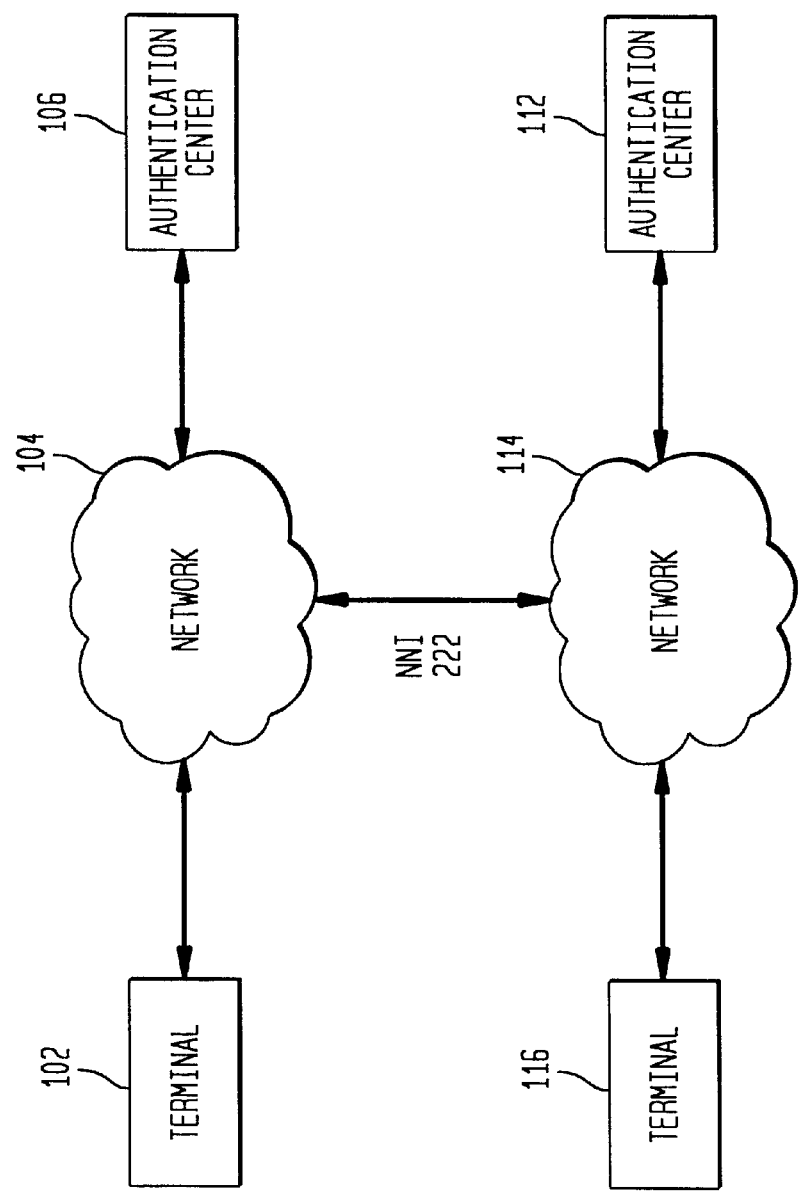
FIG. 5 is a block diagram of a generic communication system.

FIG. 5 illustrates a basic communication system. A terminal 102 communicates with a network 104, which is connected to an authentication center 106. The network 104 is connected to a second network 114 via a Network-to-Network interface (NNI) 222. The network 114 is connected to a terminal 116 and an authentication center 112.

Figure 6:
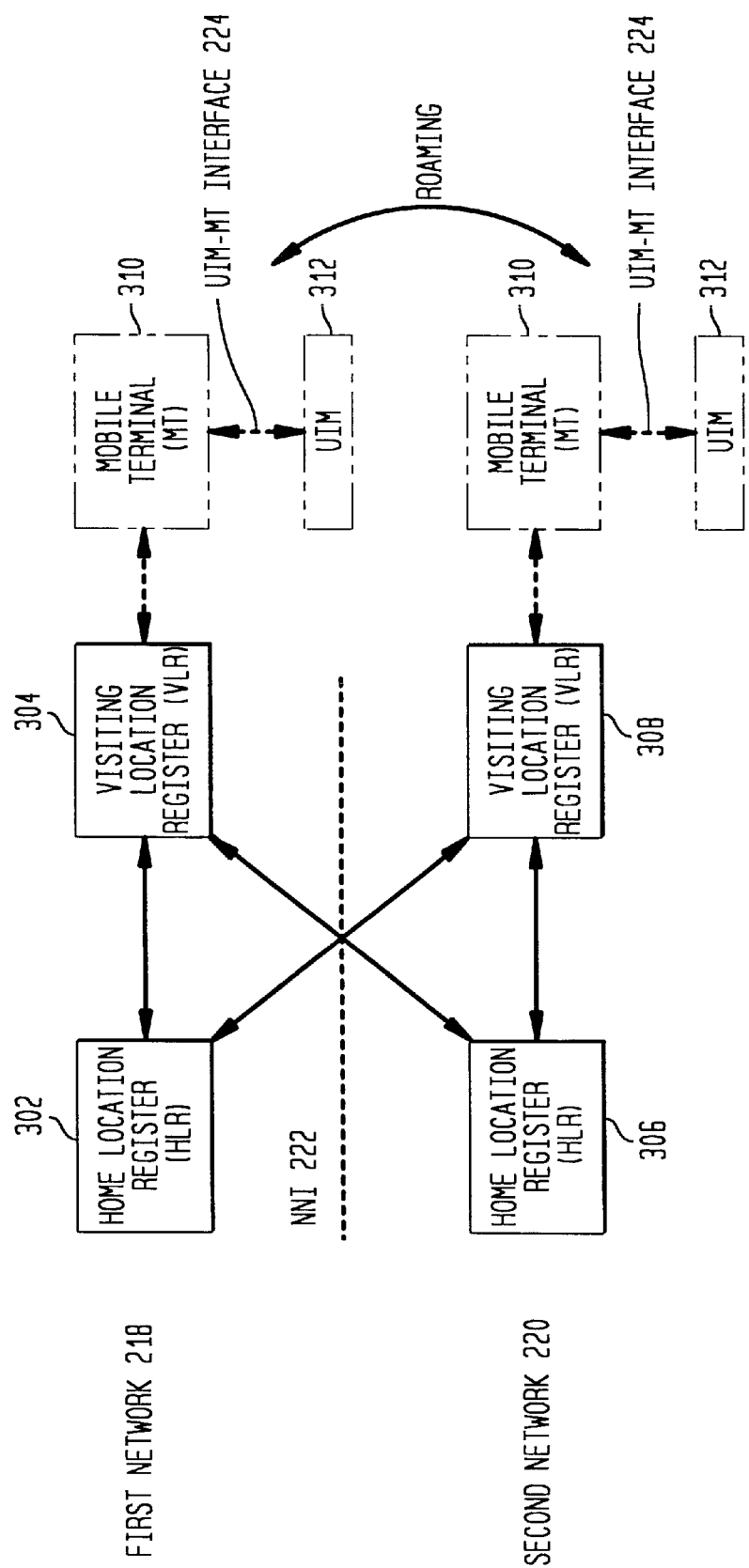
FIG. 6 is a block diagram of a generic mobile telecommunication system.

A basic mobile communication system is illustrated in FIG. 6.

In the embodiment illustrated in FIG. 6, the home location register (HLR) 302 and visiting location register (VLR) 304 belong to the first network 218 and the home location register (HLR) 306 and visiting location register (VLR) 308 belong to the second network 220. When the first network and the second network utilize different authentication schemes for authenticating the user of mobile terminal 310 with UIM 312, a problem arises regarding how the user is authenticated. The present invention solves this problem by providing an authentication interoperability function, which translates between the authentication schemes of the two networks. The authentication interoperability function disclosed in the present application describes how to authenticate a "global" roamer, such as within IMT-2000. This authentication interoperability function integrates the authentication architectures of two networks which utilize different authentication schemes, such as the GSM network and the IS-41 network. A more detailed illustration of the network elements utilized in the GSM network and the IS-41 network is illustrated in FIGS. 7 and 8.

Figure 7:
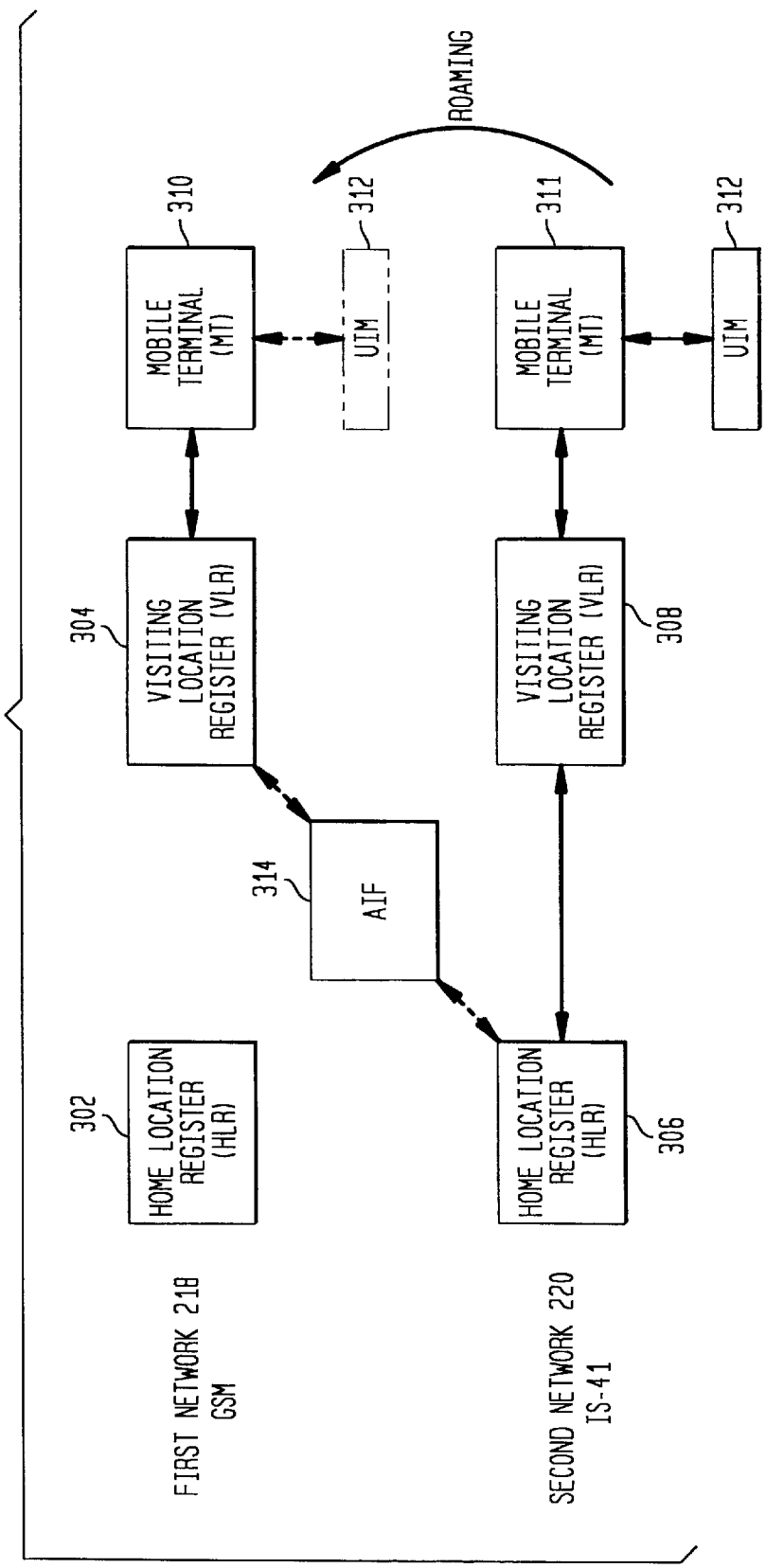
FIG. 7 is a block diagram illustrating how an IS-41 user roams into a GSM network.

FIG. 7 illustrates that the first network 218 is a GSM network. This network includes a home location register 302, a visiting location register 304, and a mobile terminal 310 with UIM 312. The second network 220 is an IS-41 network which includes a home location register 306, a visiting location register 308, and a mobile terminal 311 with UIM 312. The authentication interoperability function 314 is utilized when the user of UIM 312 roams to another system, such as the GSM network, as illustrated in FIG. 7.

Figure 8:
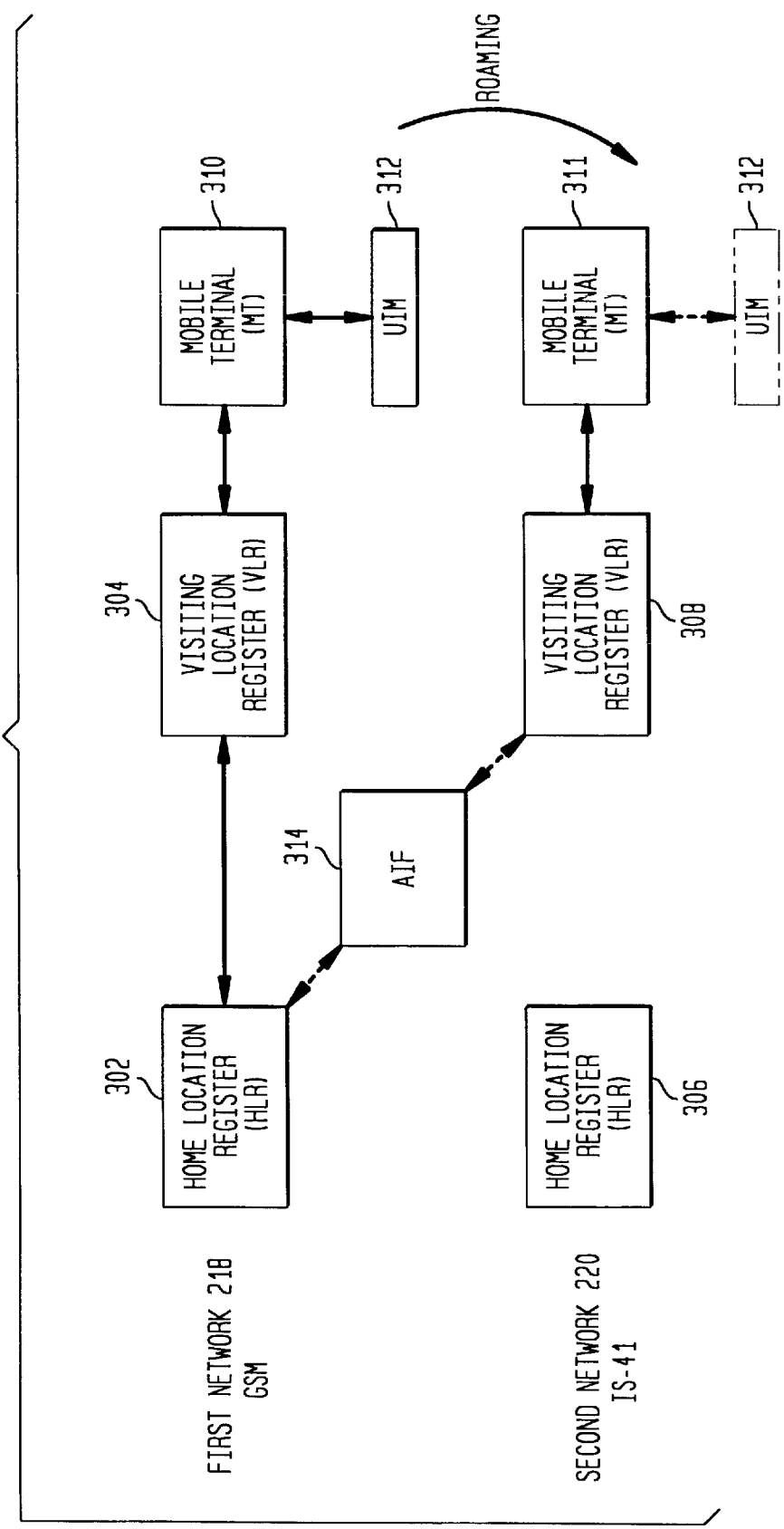
FIG. 8 illustrates how a GSM user roams into an IS-41 network.

FIG. 8 illustrates the converse situation, where a user from the GSM network roams to the IS-41 network.

IS-41 User Roaming in a GSM Network

Figure 9:
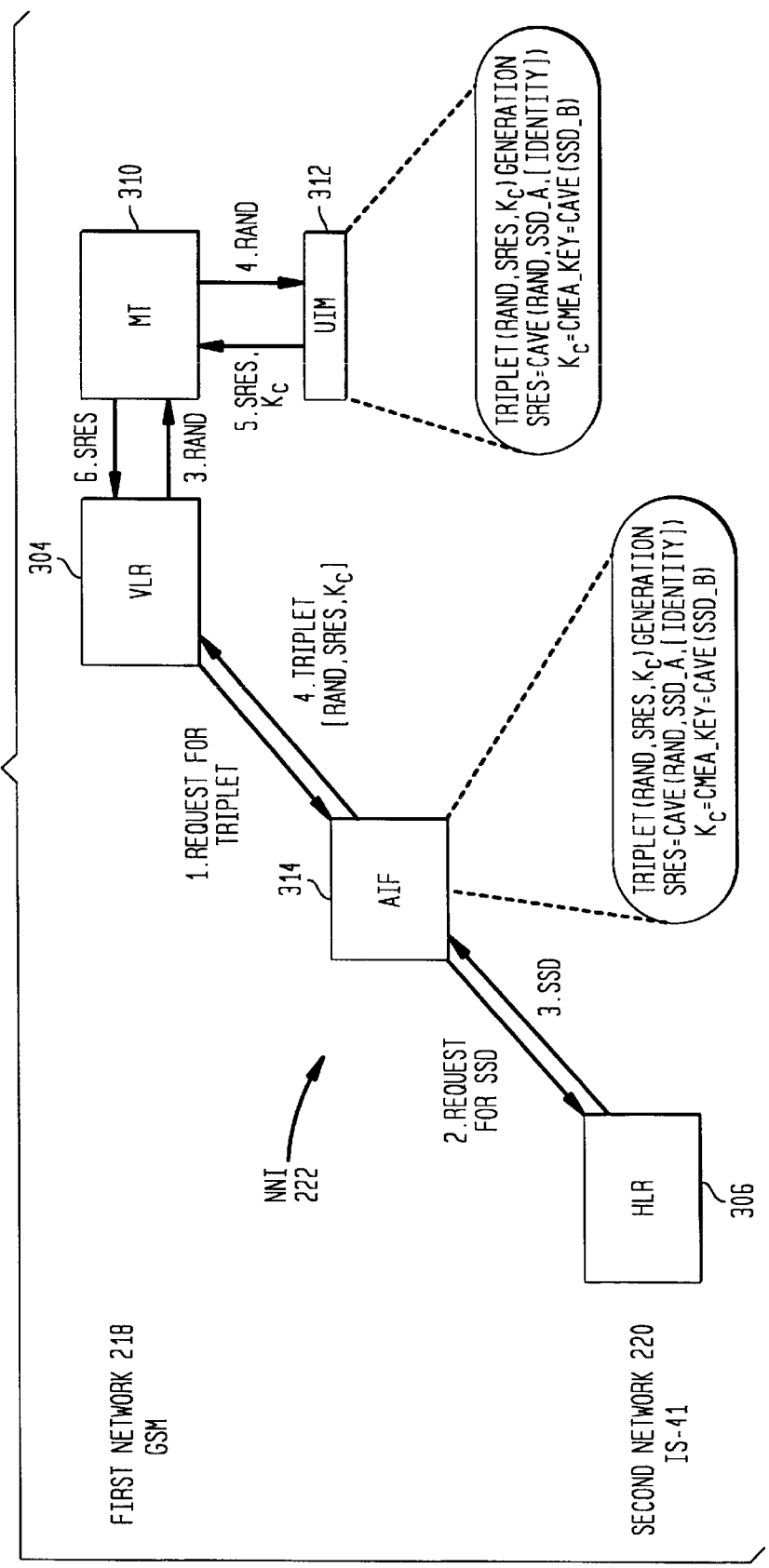
FIG. 9 illustrates the roaming IS-41 user in more detail.

When an IS-41 user roams to a GSM network, the AIF 314 generates an authentication triplet from SSD. As illustrated in FIG. 9, the HLR 306 sends the currently stored SSD to the AIF 314, which uses the SSD to generate a triplet, which is sent to VLR 304. Then, the VLR 304 authenticates the UIM 312 by sending RAND to the UIM 312 via the MT 310. The UIM 312 generates SRES and $K_c$ with RAND and SSD and sends SRES and $K_c$ to the MT 310. The MT 310 sends SRES to the VLR 304, which compares this SRES with the SRES received from the AIF 314 to authenticate the user. The GSM VLR 304 sends a request for triplets across the Network-to-Network Interface (NNI) 222 to the AIF 314 via a registration notification message (NNI REGNOT). The AIF 314 retrieves the user's SSD from the IS-41 HLR 306 and uses it to calculate triplets (RAND, SRES, $K_c$). The triplets are sent to the GSM VLR 304 via the response message NNI REGNOT. The AIF 314 is equipped with CAVE (or the current authentication algorithm in the IS-41 network's Common Cryptographic Algorithms (CCA)), which will be used to generate the triplets. Due to the triplet concept, the GSM architecture does not need to know the authentication algorithm; the algorithm only resides in the UIM 312 and the IS-41 HLR 306. In other words, the GSM VLR 304 does not need to have CAVE.

The size of the challenge and response parameters differ between the IS-41 and the GSM networks. To generate a GSM authentication pair from an IS-41 SSD, the size conversion is performed at the AIF 314: in particular, the AIF 314 generates a 32-bit RAND, calculates an 18-bit authentication response AUTHR, using the CAVE algorithm, using the 32-bit RAND, a 64-bit SSD_A, an identity value, and the authentication data AUTH_DATA. The AIF 314 also generates a 128-bit RAND from the 32-bit RAND and generates a 32-bit SRES from the 18-bit AUTHR by padding on the left with zeros or dummy values.

Normally, during authentication of an IS-41 call origination, the dialed digits are used as the authentication data AUTH_DATA, which provides protection against replay of a global challenge. This is not done in the GSM network because the triplet might be calculated in advance, when the dialed digits are not known. In addition, a triplet is only used once; therefore there is less danger of a replay attack. Therefore, when generating a GSM triplet from SSD, AUTH_DATA is set to international mobile subscriber identity (IMSI) as it is during a unique challenge.

The third parameter of the GSM triplet, after RAND and SRES, is the ciphering key $K_c$. CMEA_KEY, the 64-bit root encryption and voice privacy key, is used for this purpose. CMEA_KEY is generated by the AIP 314 as defined in the IS-41 CCA as:

$K_{c64}$=CMEA_KEY$_{64}$=CAVE(SSD_B, AUTH_STATE), where AUTH_STATE is the state of the internal registers of CAVE after the calculation of the authentication response.

Once $K_c$ is determined, the triplet is complete and is sent to the GSM VLR 304 via the IS-41 HLR (306) and AIF 314 in the NNI REGNOT response message as: NNI REGNOT [RAND$_{128}$, SRES$_{32}$, K$_{c64}$].

Once the GSM VLR 304 receives the triplet, authentication of the IS-41 phone proceeds as usual, except that the UIM 312 calculates the authentication parameters using CAVE. This process is transparent to the GSM network 218 and is conventionally performed in accordance with the standards set forth by ETSI, such that the following messages are created and exchanged:

VLR 304→MT 310: RIL3-MM AUT-REQ [RAND$_{128}$];
MT 310→UIM 312: UIM AUTHREQ [RAND$_{128}$];
UIM 312: extracts RAND$_{32}$ from RAND$_{128}$;
UIM 312: AUTHR$_{18}$=CAVE(RAND$_{32}$, SSD_A$_{64}$, [Identity], AUTH_DATA);
UIM 312: SRES$_{32}$=AUTHR$_{18}$ padded on the left 0 or random dummy bits;
UIM 312: K$_c$=CMEA_KEY$_{64}$=CAVE(SSD_B, AUTH_STATE);
UIM 312→MT 310: UIM authreq [SRES$_{32}$, K$_{c64}$];
MT 310: stores $K_c$ for ciphering;
MT 310→VLR 304: RIL3-MM AUT-RESP [SRES$_{32}$].

The UIM 312 use the 128-bit authentication challenge (RAND$_{128}$) as a parameter and provides a 32-bit authentication response (SRES) and a 64-bit ciphering key (K$_c$)

GSM User Roaming in an IS-41 Network

Figure 10:
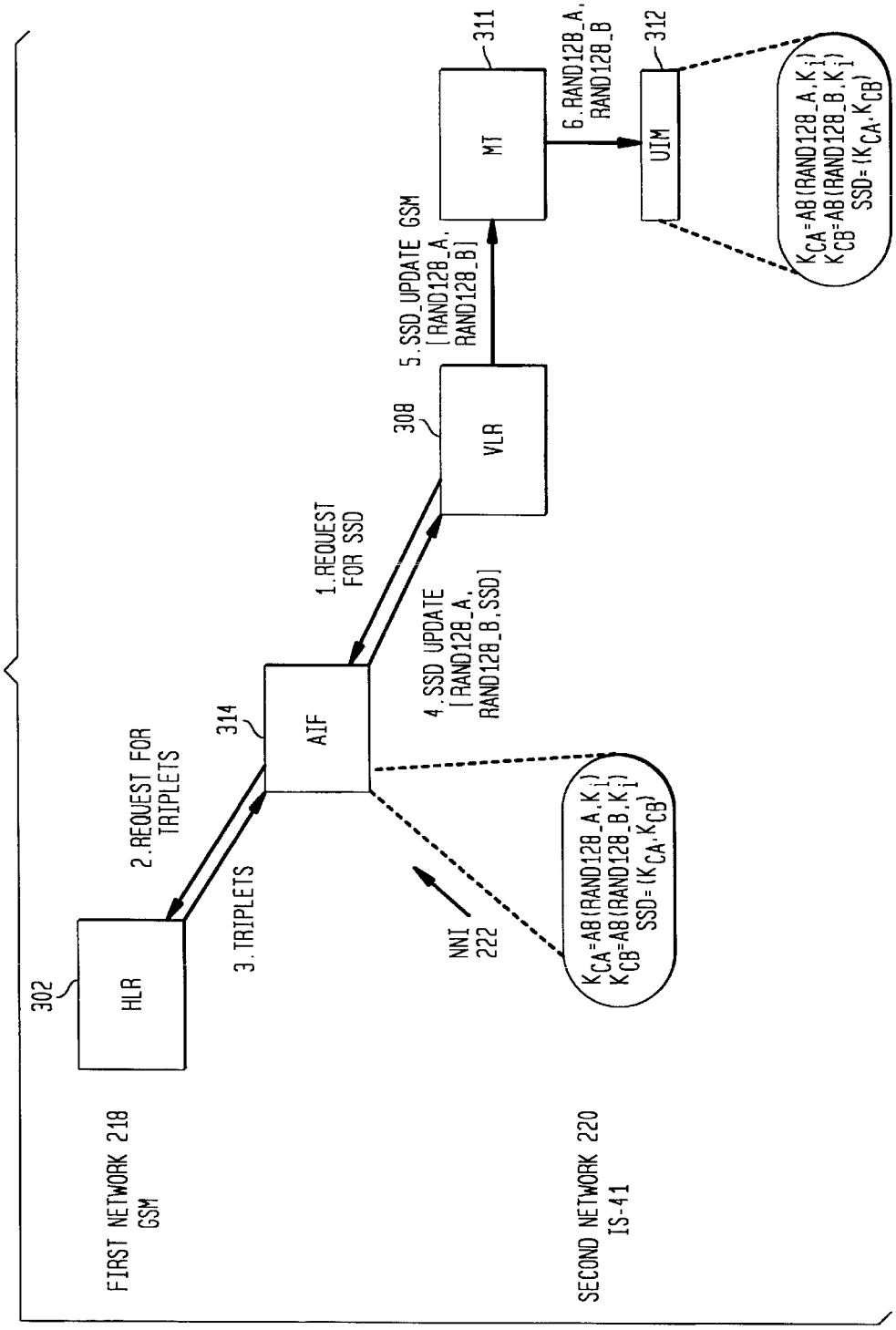
FIG. 10 illustrates the roaming GSM user in more detail.

When a GSM user roams in an IS-41 network, the goal is to create Shared Secret Data (SSD) between the IS-41 VLR 308 and the UIM 312 within the mobile terminal 310. As illustrated in more detail in FIG. 10, two triplets are sent from the HLR 302 to the AIF 314, which uses them to generate SSD update parameters, which are sent to the VLR 308. The VLR 308 sends RANDGSM_A and RANDGSM_B to the UIM 312 via the MT 311. The UIM 312 uses RANDGSM_A and RANDGSM_B to calculate $K_{CA}$ and $K_{CB}$ which are stored as the new value of SSD. Thereafter, for each system access, the VLR 308 authenticates the UIM 312 independently of the HLR 302, using SSD, according to the authentication procedure defined in IS-41.

The idea is to use triplets to generate the parameters required to perform an SSD update. The result is that the IS-41 VLR 308 shares a key (SSD) with the UIM 312 of the roaming GSM user. Subsequently for each system access, the key can be used with any authentication algorithm common between the UIM 312 and the IS-41 VLR 308.

Upon detecting a registration attempt from a GSM user, the IS-41 VLR 308 alerts the AIF 314 with a registration notification (NNI REGNOT) message. The AIF 314 then requests two triplets from the GSM HLR 302 of the GSM user. This process is transparent to the GSM network 218 and is done in accordance with the standards set forth by ETSI, such that the following messages are created by the HLR 302 and exchanged with the AIF 314:

HLR 302: Generate 128-bit RANDGSM_A, RANDGSM_B
HLR 302: K$_c$_A=A8 (RANDGSM_A, K$_i$);
HLR 302: K$_c$_B=A8 (RANDGSM_B, K$_i$);

HLR 302→AIF 314: (RANDGSM_A, SRES, K_c_A), (RANDGSM_B, SRES, K_c_B);

The AIF 314 sends the SSD Update parameters back to the IS-41 VLR 308 in the response to the registration notification message (NNI REGNOT):

AIF 314: NewSSDInfo=(K_c_A, K_c_B);

AIF 314→VLR 308: NNI regnot [RANDGSM_A, RANDGSM_B, NewSSDInfo],

NewSSDInfo has two parts: NewSSD_A=K_c_A, and NewSSD_B=K_c_B.

The IS-41 VLR 308 performs a modified SSD Update procedure with the MT 310 (via the IS-41 AUTHDIR message: note that this requires the air interface to carry the 128-bit RANDGSM parameters) after inserting the parameters RANDU and AUTHU. These two parameters are used during the unique challenge which is performed after the SSD Update. Note that this may require changes to IS-41 to allow for the larger (128-bit) RANDGSM parameters to be passed. The following messages are then created and exchanged.

VLR 308: Generate random challenge RANDU

VLR 308: AUTHU=CAVE(RANDU, NewSSD_A, [Identity])

VLR 308→MT 310: SSD_UPDATE_GSM [RANDGSM_A, RANDGSM_B].

The MT 310 passes the parameters to the UIM 312 (in the proposed message UIM UpdateSSD), which calculates the new SSD:

MT 310→UIM 312: UIM UpdateSSD [RANDGSM_A, RANDGSM_B];

UIM 312: SSD_A=A8(RANDGSM_A, $K_i$);

UIM 312: SSD_B=A8)RANDGSM_b, $k_i$);

UIM 312: NewSSD=(SSD_A, SSD_B);

Shared secret data now exists between the IS-41 VLR 308 and the GSM UIM 312. For the rest of the registration period, the UIM 312 uses SSD_A rather than $K_i$ to calculate authentication parameters. Similarly, ciphering keys are calculated with the secret SSD_B.

A Common Authentication Algorithm

There is now a secret key shared between the IS-41 VLR 308 and the UIM 312. In order for the VLR 308 to perform authentication and session key generation with the mobile terminal 310, there also needs to be a common cryptographic algorithm shared between the two entities. This algorithm could be CAVE, A3/A8, or any other authentication or key generation algorithm.

If the changes are to be isolated in the UIM 312, CAVE is inserted into the UIM 312 along with the algorithm A3. When in a native GSM network, A3 is used with the root key $K_i$. When roaming into an IS-41 network, CAVE is used with the SSD as described above.

If the changes are to be isolated in the IS-41 network, the algorithm A3 is included in the IS-41 network. The IS-41 VLR 308 would then use CAVE to authenticate native IS-41 phones, and A3 to authenticate GSM roamers.

Interoperability with PDC

The Japanese PDC signaling MAP uses an authentication scheme that is very close to a triplet-based architecture. When roaming users register in a visited network, there are two versions of the Inter-Network Authentication Information Retrieval Message which is sent from the home network to the visited network. One version simply sends to the Subscriber Authentication Key. The other version sends the Authentication Information List, which contains the random number, signed response, and the ciphering key—i.e., it is an authentication triplet. Therefore, PDC is equivalent to GSM in terms of interoperability with an SSD-based network like IS-41. Since both PDC and GSM networks use a triplet-based architecture, interworking therebetween is relatively easy. However, there is an incompatibility issue regarding the size of the signed response parameter, which is 32 bits in GSM and 64 bits in PDC. One solution is to simply disregard 32 bits of the response returned by the PDC UIM when a PDC user roams to a GSM network. This provides 32 bits less security than PDC users are accustomed to.

Security

The authentication interoperability function discussed above is designed to preserve the level of security currently enjoyed by each system, in the example above, the GSM and IS-41 networks.

IS-41 users are currently authenticated with 32-bit challenges and 18-bit responses. The level of security does not change when these parameters are embedded in larger size fields within a GSM triplet.

GSM users are currently authenticated with 128-bit challenges and 32-bit responses. Authentication of GSM users while roaming in an IS-41 network is done with IS-41 size security parameters, which have fewer bits of real security (18-bit AUTHR vs. 32-bit SRES). However, the security of GSM users at home within their own system is not lessened. In addition, the security of the root key $K_i$ is not compromised when roaming in an IS-41 network because: a) SSD_A is used in place of $K_i$ and b) the difficulty of walking back to the root key from a challenge/response pair in IS-41 is (size of key—size of AUTHR)=64–18=46 bits, which is more secure than in GSM where each challenge-response pair observed shrinks the keyspace to 64–32=32 bits.

One important impact on IS-41 users is that there is no way to do SSD Update when roaming in a GSM network. If the current SSD is compromised or corrupt, there is nothing that can be done until the user roams back into an IS-41 network. Additionally, this implies that the user cannot activate the subscription (access the network for the first time) while roaming in a GSM network, because no SSD is yet available.

GSM triplets are currently used only for a single call. In this authentication interoperability function, when a GSM user roams into a IS-41 network, a single triplet is converted into SSD_A which persists for many calls.

However, SSD_A is 64 bits long, which provides twice the bits of security as the 32-bit SRES in a triplet. The level of security cannot be more than 64 bits anyway, since everything is generated from the 64-bit root key $K_i$. On the other hand, authentication is now dependent on A8, which is used to generate SSD_A. The security implications of this are not known.

Regarding export regulations, the ciphering keys described in this application are 64-bit numbers. However, this can always be lessened to conform to government restrictions. In fact, the UIM AUTHREQ message could be designed with an additional parameter which dictates the size of the ciphering key. This way, longer keys can be used domestically while still providing the capability to roam into global markets that have shorter key sizes.

Figure 11:
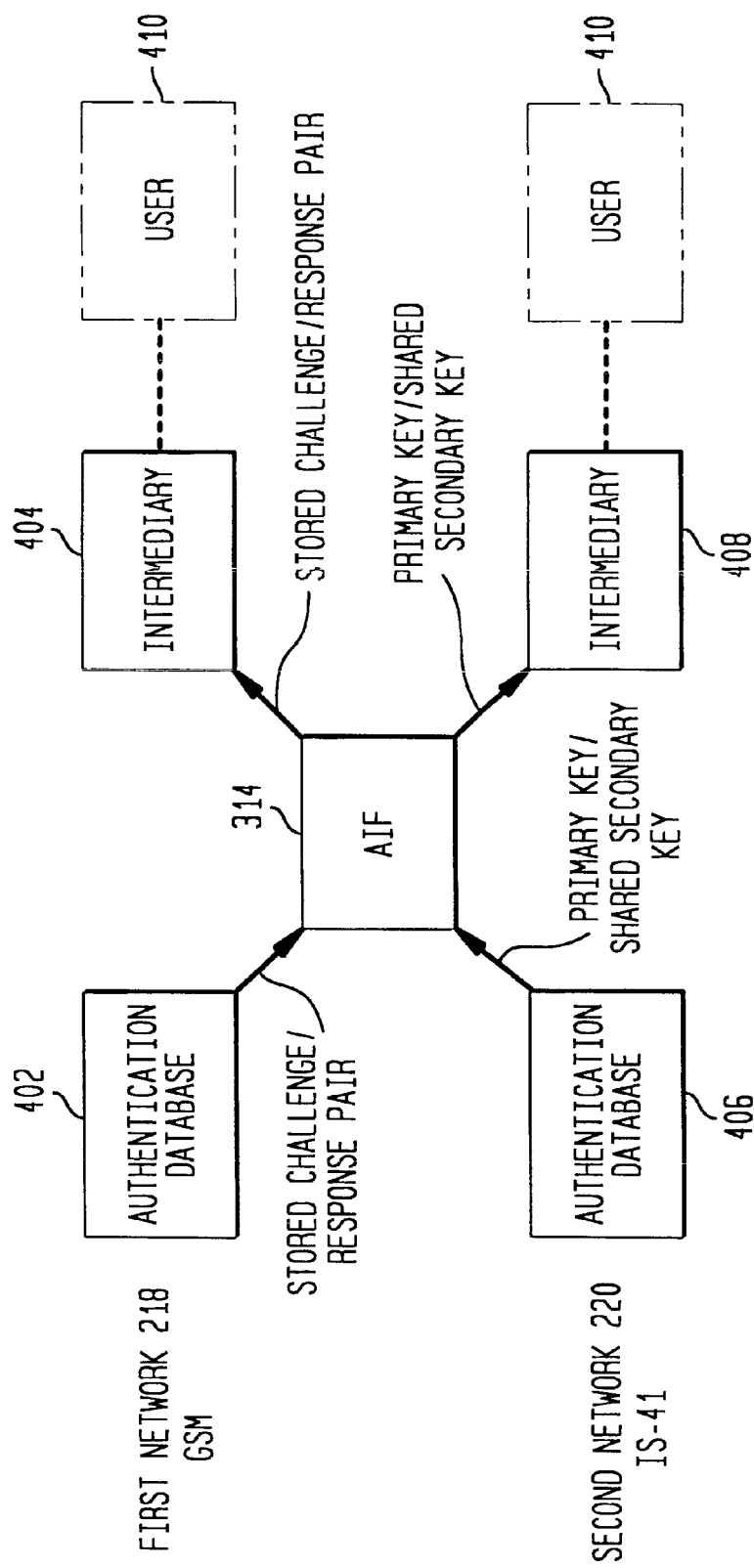
FIG. 11 illustrates a general network interface.

Although the description above discusses roaming between the GSM network and the IS-41 network, the AIF 314 of the present invention facilitates communication between any stored challenge/response pair authentication network and any primary key/shared secondary key authentication network. In particular, as illustrated in FIG. 11, the first network 218 includes an authentication data base 402 and an intermediary 404. Similarly, the second network 220 includes an authentication data base 406 and an intermediary 408. The AIF 314 of the present invention enables user 410 to roam between the first network 218 and the second network 220, as described above. Additionally, although FIGS. 7–11 illustrate the AIF 314 as a stand-alone network entity, the functions implemented by the AIF 314 may be built into any one or more of the HLR 302, VLR 304, HLR 306, or VLR 308 of FIGS. 7–10 or any one or more of the authentication data base 402, intermediary 404, authentication data base 406, or intermediary 408 of FIG. 11.

What is claimed:

1. An authentication interoperability function for facilitating authentication of a user from a home network when the user is in a visitor network, having a different authentication scheme from the home network, said authentication interoperability function receiving a challenge/response pair, including a triplet, from an authentication data base in the home network, creating a secondary key from the challenge/response pair, and sending the secondary key to an intermediary in the visitor network to authenticate the user from the home network;

wherein the first network is a Global System for Mobiles (GSM) network, the second network is an IS-41 network, the intermediary is a visiting location register in the IS-41 network, and the authentication data base is a home location register in the GSM network; and wherein the authentication interoperability function is colocated with the home location register in the GSM network.

2. An authentication interoperability function for facilitating authentication of a user from a home network when the user is in a visitor network, having a different authentication scheme from the home network, said authentication interoperability function receiving a challenge/response pair, including a triplet, from an authentication data base in the home network, creating a secondary key from the challenge/response pair, and sending the secondary key to an intermediary in the visitor network to authenticate the user from the home network;

wherein the first network is a Global System for Mobiles (GSM) network, the second network is an IS-41 network, the intermediary is a visiting location register in the IS-41 network, and the authentication data base is a home location register in the GSM network; and wherein the authentication interoperability function is colocated with the visiting location register in the IS-41 network.

* * * * *